N. MENDENHALL.
SEED PLANTER.
No. 99,217.   Patented Jan. 25, 1870.
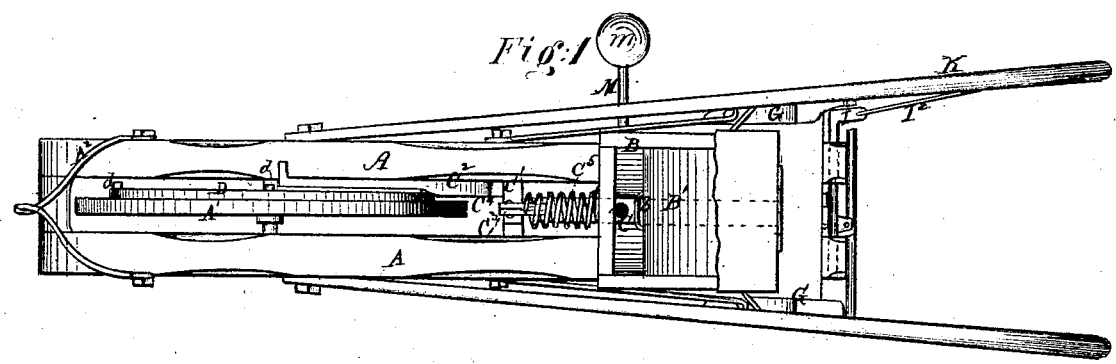
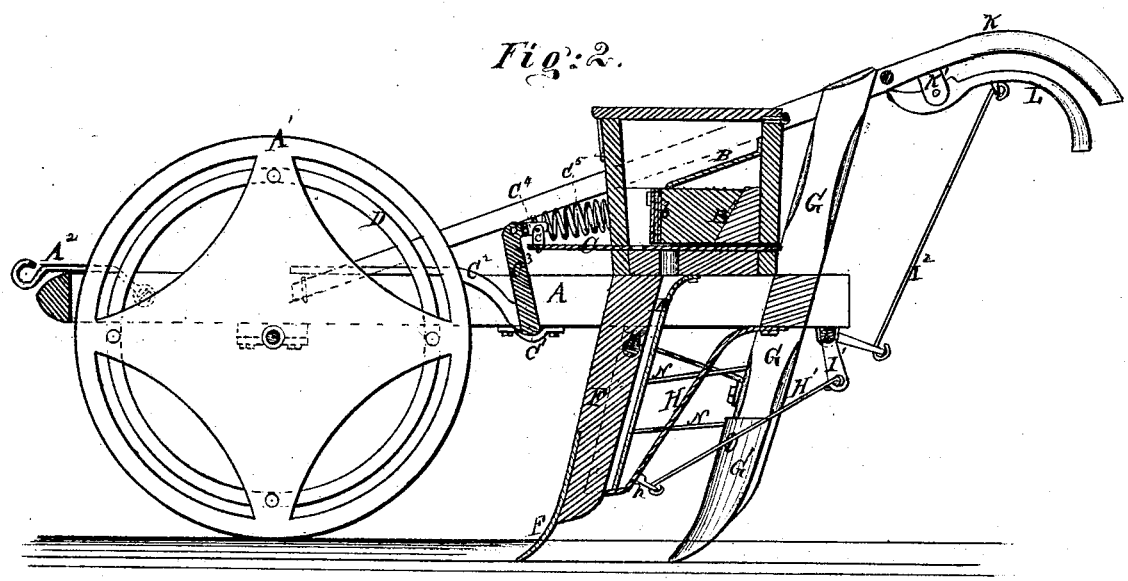

United States Patent Office.

NOAH MENDENHALL, OF GREENSBURG, INDIANA.

Letters Patent No. 99,217, dated January 25, 1870.

IMPROVEMENT IN SEED-PLANTERS.

The Schedule referred to in these Letters Patent and making part of the same.

To all whom it may concern:

Be it known that I, NOAH MENDENHALL, of Greensburg, in the county of Decatur, and State of Indiana, have invented certain Improvements in Seed-Planters; and I do hereby declare that the following is a full, clear, and exact description thereof, reference being had to the annexed drawings, making part of this specification, in which—

Figure 1 is a plan view, and

Figure 2, a longitudinal vertical section.

The same letters are used in both figures to denote like parts.

My invention relates to a machine for planting corn or other seed; and

My improvements consist in the combination and arrangement of some of the parts of which it is composed, as hereinafter more fully described.

To enable those skilled in the art to make and use my invention, I will proceed to describe its construction and operation.

The various parts necessary to the successful operation and manipulation of the machine are attached to the frame A, consisting of two stout parallel beams of wood united together by cross-beams at their front and rear ends, and mounted upon a ground-wheel, $A^1$, the axle of which has its bearings in boxes secured under the frame, as shown.

A bail, $A^2$, is pivoted at the front end, to which to hitch the horses.

B represents the seed-box, secured upon the rear end of the frame. Its bottom is made concave, and provided with an aperture, through which the seed is discharged into the seed-tube.

A block, B', of wood, is secured in the box, partially covering the bottom, and extending over the aperture therein.

Between this block and the bottom, the seed-slide C is arranged, having an aperture formed in it, which is alternately brought forward to be filled with seed, and pushed back to discharge the same into the seed-tube.

A brush, $b$, is arranged at the front of the block B', sweeping the seed-slide in the usual manner. The front end of the slide projects some distance through the box, and has secured upon it a short standard, $c$.

$C^1$ is a rock-shaft, placed in bearings under the frame A, between the seed-box and the ground-wheel.

Upon this shaft is secured a lever, $C^2$, which is curved upward from its fulcrum for some distance, and then forward, in a nearly horizontal line, along one side of the wheel to near its axle, as clearly shown in fig. 2. Its outer end is bent at right angles to the main portion, so as to form a short arm, reaching over the top of the frame.

Another lever, $C^3$, is secured upon this shaft, extending upward therefrom, and connected, at its upper end, to the seed-slide, by means of a link, $C^4$.

$C^5$ is a coiled spring, one end of which is secured to the seed-box, and its other end acts upon the seed-slide and its attachments, pushing the former forward until the arm on the outer end of lever $C^2$ is stopped, by coming in contact with the frame A.

D represents an annular rim, of somewhat smaller diameter than the wheel A', and secured upon the same on that side which faces the lever $C^2$. This rim is to be perforated at different points, and, in some of these perforations, pins, $d$, are to be inserted, projecting outward therefrom a sufficient distance, that, in the revolutions of the wheel, they will be brought in contact with the lever $C^2$, raising the same, which will have the effect to push the seed-slide back, so as to bring its filled cup opposite the discharge-aperture, in the bottom of the seed-box. As soon as a pin escapes from under the lever $C^2$, it, together with the seed-slide, will be returned to its normal position by the action of the spring $C^5$. By using more or fewer pins, the discharge of the seed can be regulated.

E represents the seed-tube, fastened under the bottom of the seed-box, and extending downward to near the ground, directly in rear of the standard F, to which it may be secured, as shown.

A shovel, F', is attached to the standard in the usual manner, for making a furrow in the ground, into which the seed is dropped.

G G represent two standards, secured to the ends of the rear cross-beam of the frame, some distance behind the standard F, and provided with half shovels G', so arranged upon them as to scrape the earth back into the furrow made by the front shovel, and thus cover the seed. These standards extend upward above the frame A some distance, as shown. Both the front and rear standards are suitably braced to the frame.

H represents a flat spring, fastened under the rear cross-beam of the frame, from which point it extends downward to the lower end of the seed-tube, where it is bent so as to reach under and cover the end of the same.

A lug, $h$, is riveted on it, near its lower end, to which a connecting-rod, H', is pivoted, which latter is attached, at its other end, to a lever, $I^1$. This lever is secured upon a rock-shaft, I, having its bearings in boxes secured under the rear end of the frame. This shaft is provided with a crank upon one end, to the wrist of which is attached a rod, $I^2$, which is carried upward from thence, and pivoted, at its upper end, to the long arm of the lever L.

K K represent the handles, which are secured on the frame and the upper ends of the standards G.

L represents the lever above mentioned, which is fulcrumed in an eye-bolt, K', secured under one of the handles. The long arm of the lever extends to the rear, and is curved in conformity with the curvature of the handle. Its short arm serves as a stop to the action of the spring H, the tendency of which is to project forward and under the seed-tube. Thus, on raising the long arm of the lever L, the spring H will be withdrawn from under the seed-tube, and the seed contained therein drop into the furrow; and, on releasing the lever, the spring will at once project under the tube and close its end. When it is desired to drill the seed, the lever is raised and tied to the handle.

M represents a rod, which can be screwed into the standard F on either side, so as to project laterally therefrom. Upon its outer end it carries a ball, $m$. This rod, with its ball, serves as a guide by which to determine when to drop the seed when it is to be planted in hills.

N N are rods of iron, fastened, at one end, to the front standard F, two or more upon each side of the same, from which they extend back, and are respectively fastened, at their other end, to the standards G G. They serve as fenders, to prevent clods from falling against and injuring the dropping-mechanism, as well as to somewhat pulverize the earth which is to cover the seed.

What I claim as new, and desire to secure by Letters Patent, is—

1. The combination and arrangement of the annular perforated rim D with projecting pins $d$, seed-slide C, rock-shaft $C^1$, levers $C^2$ and $C^3$, link $C^4$, and spring $C^5$, substantially as and for the purpose set forth.

2. The spring H, in combination with mechanism herein described, for operating the same, substantially as and for the purpose set forth.

3. The fenders N N, when arranged substantially as and for the purpose set forth.

In testimony whereof, I have signed my name to this specification, in the presence of two subscribing witnesses.

NOAH MENDENHALL.

Witnesses:
 WILLIAM SMILY,
 JAMES K. EWING.